US006663164B1

(12) United States Patent
Guillez et al.

(10) Patent No.: US 6,663,164 B1
(45) Date of Patent: Dec. 16, 2003

(54) FOLDING HARD TOP SYSTEM FOR CONVERTIBLE STRUCTURE, IN PARTICULAR FOR MOTOR VEHICLE

(75) Inventors: Jean-Marc Guillez, Cerizay (FR); Paul Queveau, Cerizay (FR); Gerard Queveau, Cerizay (FR)

(73) Assignee: Societe Europeenne de Brevets Automobiles (FR)

( * ) Notice: Subject to any disclaimer, the term of this patent is extended or adjusted under 35 U.S.C. 154(b) by 0 days.

(21) Appl. No.: 10/148,357

(22) PCT Filed: Nov. 22, 2000

(86) PCT No.: PCT/FR00/03254

§ 371 (c)(1),
(2), (4) Date: Sep. 3, 2002

(87) PCT Pub. No.: WO01/40007

PCT Pub. Date: Jun. 7, 2001

(30) Foreign Application Priority Data

Nov. 30, 1999 (FR) .............................................. 99 15106

(51) Int. Cl.⁷ ................................................ B60J 7/08
(52) U.S. Cl. .................... 296/108; 296/107.17
(58) Field of Search ....................... 296/107.01, 107.08, 296/108, 116, 117, 107.17, 121

(56) References Cited

U.S. PATENT DOCUMENTS

| | | | | |
|---|---|---|---|---|
| 3,575,464 A | * | 4/1971 | Himka et al. ................ | 296/117 |
| 5,520,432 A | * | 5/1996 | Gmeiner et al. ............ | 296/108 |
| 6,390,531 B1 | * | 5/2002 | Schutt ................... | 296/107.13 |
| 6,390,532 B1 | * | 5/2002 | Mac Farland .......... | 296/107.17 |
| 6,422,637 B1 | * | 7/2002 | Mad Farland ......... | 296/107.15 |
| 6,425,622 B2 | * | 7/2002 | Eberle ........................ | 296/108 |
| 6,478,362 B2 | * | 11/2002 | Obendiek ................... | 296/108 |
| 6,481,781 B2 | * | 11/2002 | Bergerhoff et al. .... | 296/107.17 |
| 6,505,881 B2 | * | 1/2003 | Kinnanen .............. | 296/107.17 |

* cited by examiner

Primary Examiner—Stephen T. Gordon
Assistant Examiner—Gregory Blankenship
(74) Attorney, Agent, or Firm—Bachman & LaPointe, P.C.

(57) ABSTRACT

The front second panel is connected to the rear first panel via two sets of substantially parallel front and rear auxiliary pivot arms each hinged at its rear end to a respective rear hinge point fixed to the rear first panel and at its front end to a respective front hinge point fixed to the front second panel. The roof system has mechanisms for causing the two sets of auxiliary arms to pivot in one direction or the other in order to open or close the roof system, and the two auxiliary arms in a given set are arranged in such a manner as to be situated transversely on the outside of the roof panels.

11 Claims, 4 Drawing Sheets

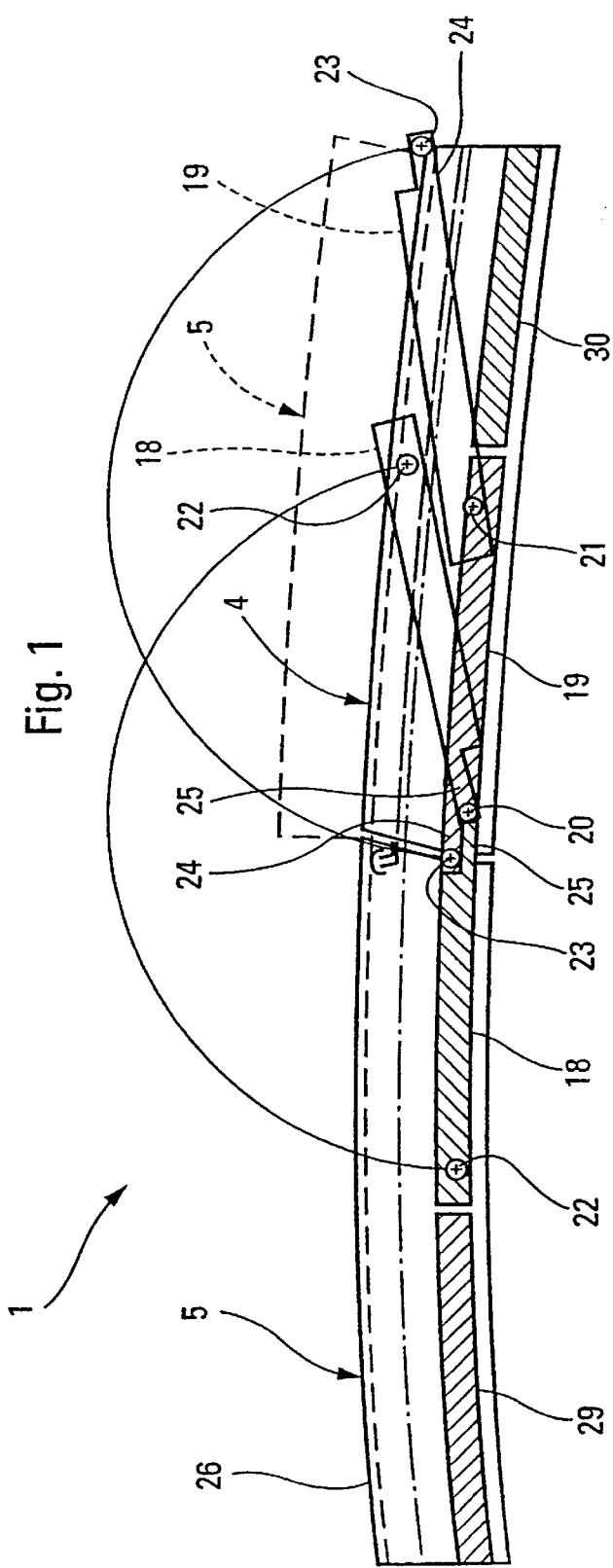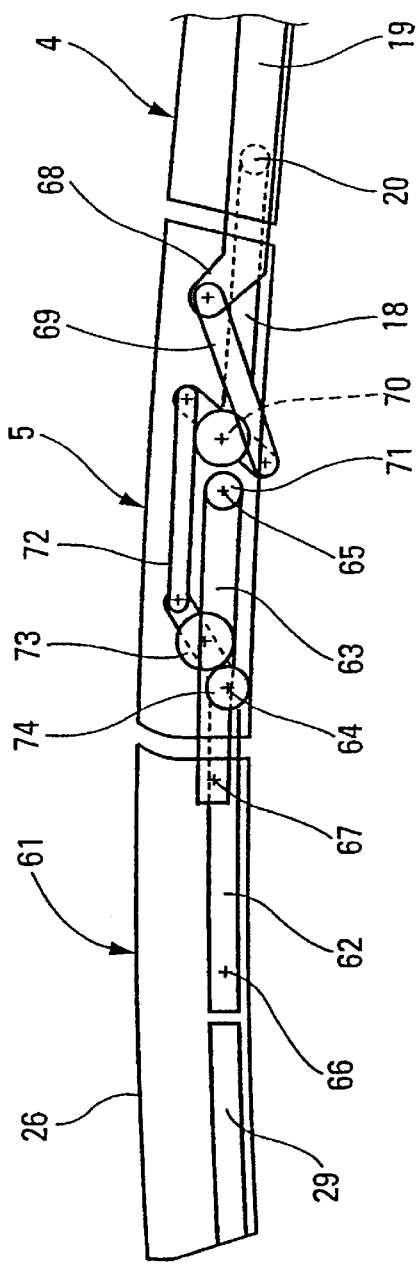

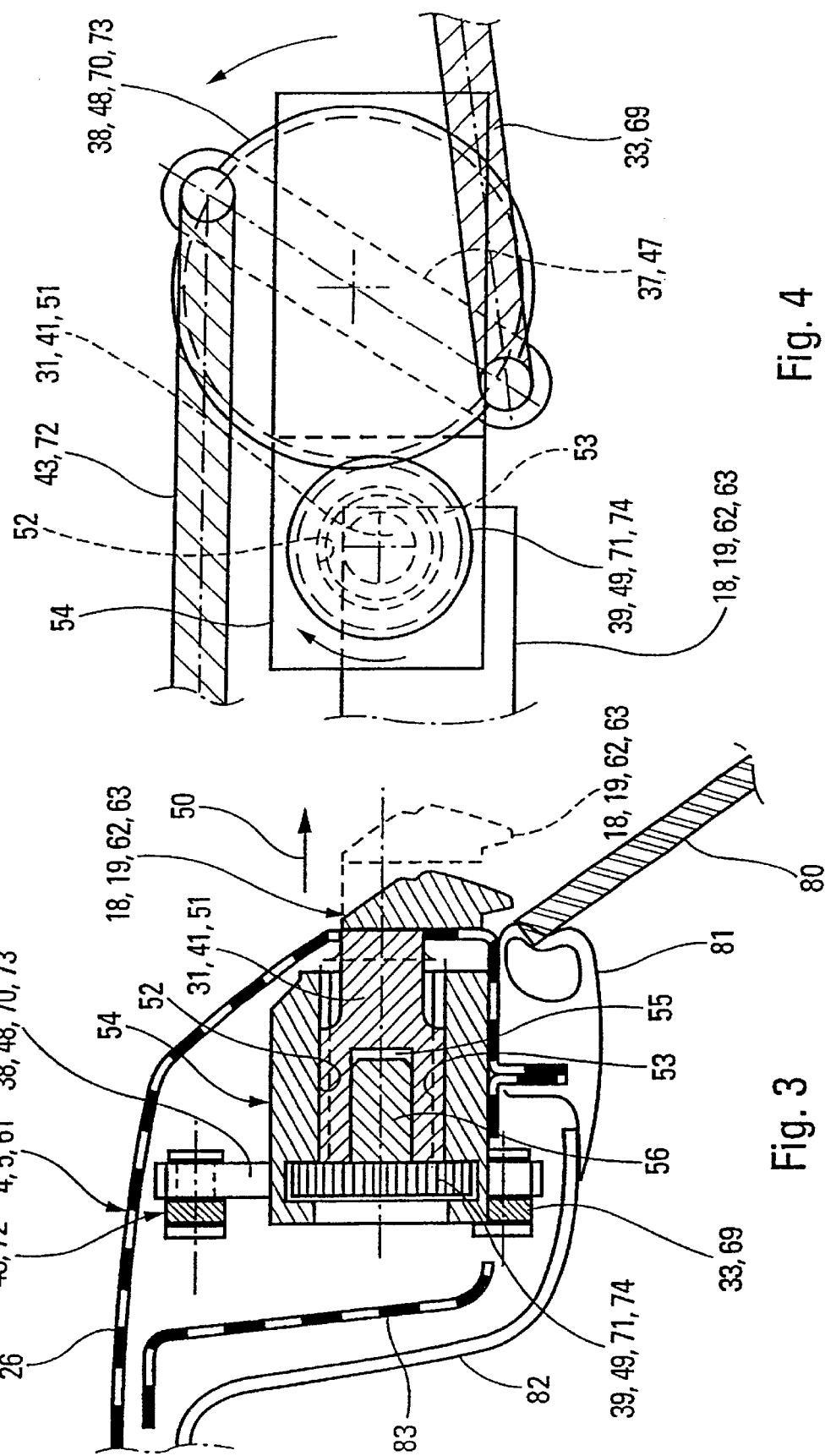

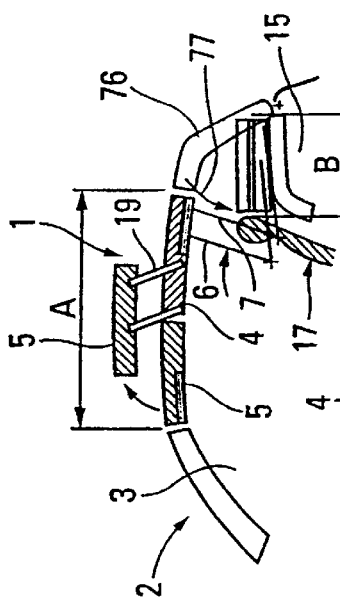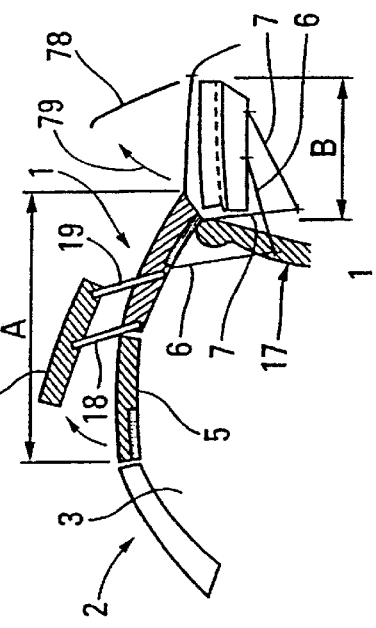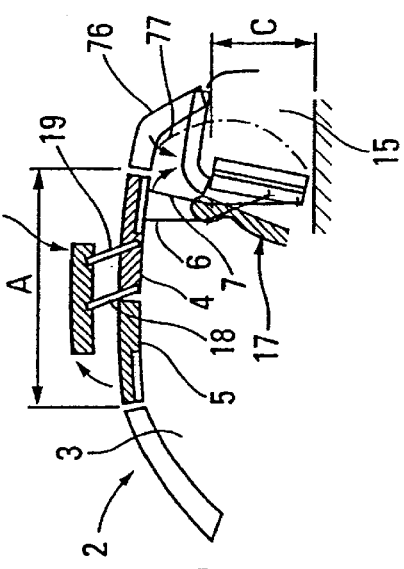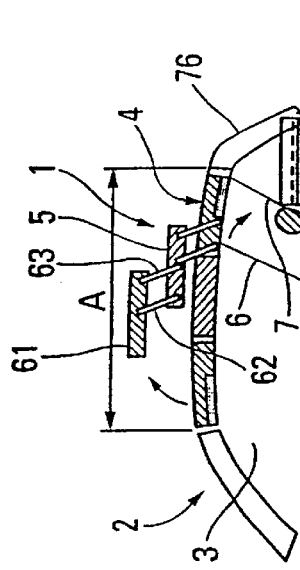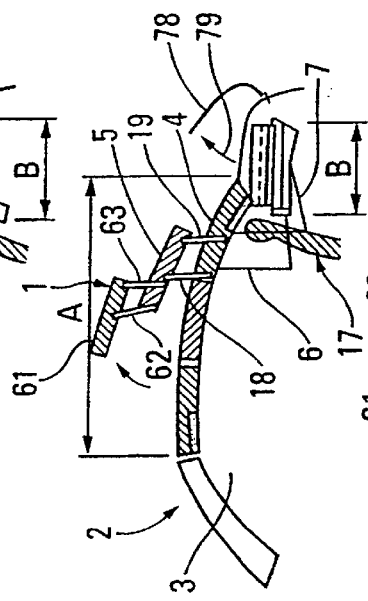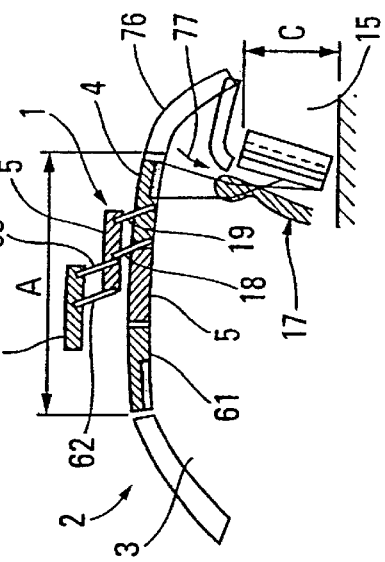

FOLDING HARD TOP SYSTEM FOR CONVERTIBLE STRUCTURE, IN PARTICULAR FOR MOTOR VEHICLE

BACKGROUND OF THE INVENTION

The present invention relates to a retractable rigid roof system for an uncoverable structure, in particular for a motor vehicle.

Document U.S. Pat. No. 3,575,464 in particular discloses a retractable rigid roof system constituted by at least two rigid panels that are movable relative to each other and relative to the passenger compartment of the structure, comprising a rear first panel and a front second panel linked together by linking means arranged in such a manner that the front second panel is movable relative to the rear first panel between a closed position in which it covers the passenger compartment and an open position in which it is in a position that is substantially superposed relative to the rear first panel, the rear first panel being mounted to pivot relative to the bodywork of the structure in such a manner as to pivot together with the front second panel between a closed position in which it covers the passenger compartment, and an open position in which the rear first panel and the front second panel are received in their substantially superposed position behind the passenger compartment.

In that state of the prior art, the front second panel of the roof pivots upwards and rearwards relative to the rear first panel so that in the open position of the roof both panels are received in the rear trunk of the vehicle in question, the concave side of the front panel then being turned upwards while the concave side of the rear panel is turned downwards, such that these two panels occupy a large volume inside the rear trunk of the vehicle.

In addition, such a structure having two panels that pivot relative to each other poses awkward problems of interconnection and leakproofing when the roof is in the closed position.

SUMMARY OF THE INVENTION

An object of the present invention is to remedy the drawbacks of known roof systems and to propose a roof system of the above-specified type which is simple, reliable, of low cost, and which makes it possible in particular to simplify problems associated with interconnecting and leakproofing panels.

In the present invention, the retractable rigid roof system of the above-specified type is characterized in that the front second panel is connected to the rear first panel via two sets of two substantially parallel auxiliary pivot arms, each set comprising a front arm and a rear arm, each arm being pivoted at its rear end to a respective rear hinge point fixed to the rear first panel and at its front end to a respective front hinge point fixed to the front second panel, in that the roof system comprises means for causing the two sets of auxiliary arms to pivot in one direction or the other to open or close said roof system, and in that the two auxiliary arms in a given set are arranged so as to be situated transversely outside the roof panels.

The two sets of two auxiliary pivot arms thus hold the front second panel substantially parallel to itself so that the concave side of the front second panel remains turned in the same direction as that of the rear first panel. Thus, when the roof is in its open position, the two panels occupy a minimum volume whatever the final position occupied by these two panels in the rear trunk of the vehicle.

In addition, the pivoting movements of the auxiliary arms are not in any way disturbed by the displacement movements of the roof panels, thereby considerably simplifying any problems of cutting out the panels and also of sealing both between the panels and between the panels and the structure in question.

Other features and advantages of the present invention appear in the following detailed description.

BRIEF DESCRIPTION OF THE DRAWINGS

In the accompanying drawings, given purely as non-limiting examples:

FIG. 1 is a diagram in longitudinal section showing an embodiment of a roof system in accordance with the present invention;

FIG. 3 is an enlarged view in vertical axial cross-section showing an embodiment of the pivot shaft at each end of each auxiliary arm;

FIG. 4 is a diagrammatic elevation view as seen from the left of FIG. 3;

FIG. 5 is a section view similar to FIG. 1 showing another embodiment of the present invention; and FIGS. 6 to 11 are diagrammatic views showing how the embodiments of FIGS. 1 and 5 respectively are implemented on three different types of vehicle body.

DETAILED DESCRIPTION OF THE PREFERRED EMBODIMENT(S)

Figure 2:
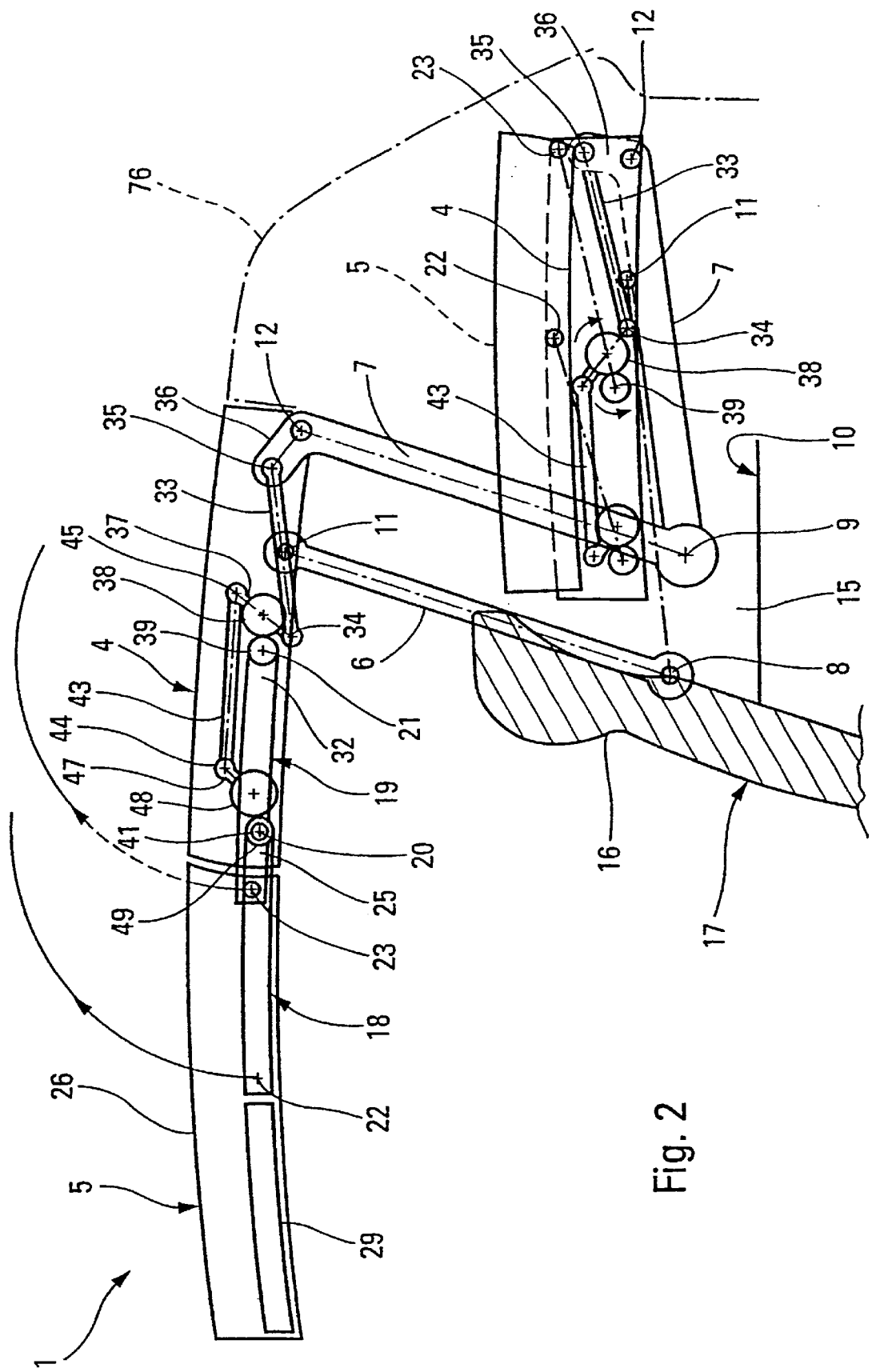
FIG. 2 is a view similar to FIG. 1 showing an embodiment of means of the invention for pivoting the auxiliary arms.

In the embodiment shown in FIGS. 1 and 2, the retractable rigid roof system 1 for an uncoverable structure 2, in particular for a motor vehicle, is constituted by at least two rigid panels 4, 5 that are movable relative to each other and relative to the passenger compartment 3 of the vehicle 2.

In this example, the roof 1 is constituted by a rear first panel 4 and by a front second panel 5 which are linked together by linking means described below.

These linking means are arranged in such a manner that the front second panel 5 can move relative to the rear first panel 4 between a closed position, represented diagrammatically by solid lines in FIG. 1, in which the passenger compartment 3 is covered, and an open position represented diagrammatically by dashed lines in FIG. 1 in which the front panel is in a position where it is substantially superposed on the rear first panel.

In the example shown in FIG. 2, the rear first panel 4 is pivotally mounted on two sets of main pivot arms, each set comprising a front arm 6 and a rear arm 7, which arms are substantially parallel, each being hinged at a bottom end to a respective bottom hinge point 8, 9 fixed to the bodywork, shown diagrammatically at 10, of the structure 2, and at a top end to a respective top hinge point 11, 12 fixed to the rear first panel 4.

The rear first panel 4 can thus pivot, taking the front second panel 5 with it, between a closed position shown diagrammatically in FIGS. 1 and 2, where it covers the passenger compartment 3, and an open position in which the rear first panel 4 and the front second panel 5 are received in their substantially superposed position behind the passenger compartment 3, in a position which can vary depending on the type of vehicle, for example in the substantially horizontal position shown diagrammatically in FIG. 2, inside the rear trunk 15 of the vehicle 2, as provided behind the seat back 16 of the back seat given overall reference 17 in FIG. 2.

In the invention, and as shown in FIGS. 1 and 2, the front second panel 5 is connected to the rear first panel 4 by two sets of substantially parallel auxiliary pivot arms, each set comprising a front arm 18 and a rear arm 19, each arm being hinged at its rear end to a respective rear hinge point 20, 21 fixed to the rear first panel 4, and at its front end to a respective front hinge point 22, 23 fixed on the front second panel 5.

The roof system 1 also has means for causing the two sets of auxiliary arms 18, 19 to pivot in one direction or the other when said roof system 1 is opened or closed.

As shown diagrammatically in FIG. 1, when the roof 1 is in the closed position, the front hinge point 23 of the rear auxiliary arm 19 is situated in front of the rear hinge point 20 of the front auxiliary arm 18.

Similarly, the front end 24 of the rear auxiliary arm 19 covers the rear end 25 of the front auxiliary arm 18.

What is claimed is:

1. A retractable rigid roof system for an uncoverable structure comprising a roof constituted by at least two rigid panels that are movable relative to each other and relative to a passenger compartment of the structure, said at least two rigid panels including a rear first panel and a front second panel linked together by linking means arranged in such a manner that the front second panel is movable relative to the rear first panel between a closed position in which the front second panel covers the passenger compartment and an open position in which the front second panel is in a position that is substantially superposed relative to the rear first panel, the rear first panel being mounted to pivot relative to a bodywork of the structure in such a manner as to pivot together with the front second panel between a closed position in which the rear first panel covers the passenger compartment, and an open position in which the rear first panel and the front second panel are received in their substantially superposed position behind the passenger compartment, the front second panel being connected to the rear first panel via two sets of two substantially parallel auxiliary pivot arms, each set of pivot arms comprising a front arm and a rear arm, each of said arms being pivoted at a rear end to a respective rear hinge point fixed to the rear first panel and at a front end to a respective front hinge point fixed to the front second panel, the two arms in each set being arranged so as to be situated transversely outside the front second and rear first panels, means for causing respective pivot shafts of the rear ends of both said arms in both sets of auxiliary arms to pivot in one direction to open said roof system and in another direction to close said roof system.

2. A roof system according to claim 1, wherein in each set of pivot arms, in the closed position of the roof system, the front hinge point of the rear arm is situated in front of the rear hinge point of the front arm, and the front end of the rear arm covers the rear end of the front arm.

3. A roof system according to claim 1, wherein the rear first panel carries, behind the rear hinge point of each said rear arm, a respective rear fixed arm element extending the rear arm substantially rearwards.

4. A roof system according to claim 3, wherein the front second panel carries in front of the front hinge point of each said front arm, a front fixed arm element extending the front arm substantially forwards.

5. A roof system according to claim 1, further comprising actuating means for transverse and axial translation of a pivot shaft of each end of each said arm, whereby said pivot shaft is moved transversely and axially outwards during pivoting of said arms for opening the roof system.

6. A roof system according to claim 5, wherein the pivot shaft of each end of each said arm includes a threaded cylindrical outer peripheral portion for co-operating with a tapped inner cylindrical portion of a nut-forming element fixed on a corresponding one of said panels.

7. A roof system according to 1, further comprising an additional pivot shaft of the rear end of each said rear arm being actuated by means of a first link hinged at a front end to a front hinge point constrained to pivot with one of said pivot shafts and at a rear end to a rear hinge point, and the first link driving a first driving gearwheel which drives a first driven gearwheel mounted on the pivot shaft of the corresponding rear arm.

8. A roof system according to claim 7, characterized in that the pivot shaft of the rear end of each front arm is actuated by a second link hinged at a front end at a front hinge point constrained to pivot with said rear end pivot shaft of said front arm, and at a rear end at a rear hinge point constrained to pivot with the pivot shaft of the corresponding rear arm, and the second link driving a second driving gearwheel which drives a second driven gearwheel mounted on said rear end pivot shaft.

9. A roof system according to claim 8, wherein respective gear ratios between the first driving gearwheel and the first driven gearwheel, and between the second driving gearwheel and the second driven gearwheel are selected in such a manner as to adjust respective angles of rotation of each said rear and front arm as a function of a specific geometry of the roof system.

10. A roof system according to claim 7, further comprising the first rear panel being pivotally mounted on two sets of substantially parallel front and back main pivot arms, each said main pivot arm being hinged at a bottom end to a respective bottom hinge point fixed to the bodywork of the structure, and at a top end to a respective top hinge point fixed to the rear first panel, the first link being hinged to a rear hinge point secured to one of the two corresponding main pivot arms and situated on an extension of the corresponding rear main pivot arm.

11. A roof system according to claim 1, further comprising a front third panel situated when the roof system is in its closed position in front of the front second panel and connected to said front second panel via two sets of substantially parallel second auxiliary pivot arms, and each of said second auxiliary pivot arms being hinged at a rear end to the front second panel and at a front end to the front third panel.

* * * * *